United States Patent [19]
Nishihara

[11] Patent Number: 4,905,296
[45] Date of Patent: Feb. 27, 1990

[54] SYSTEM FOR SHAPE RECOGNITION
[75] Inventor: H. Keith Nishihara, Los Altos, Calif.
[73] Assignee: Schlumberger Systems & Services, Inc., San Jose, Calif.
[21] Appl. No.: 169,798
[22] Filed: Mar. 18, 1988

Related U.S. Application Data
[63] Continuation-in-part of Ser. No. 888,535, Jul. 22, 1986.
[51] Int. Cl.$^4$ .................................................. G06K 9/64
[52] U.S. Cl. .................................. 382/42; 364/728.01; 364/819
[58] Field of Search ................... 382/30, 42, 43, 31, 382/27; 364/728.01, 819, 820, 725, 826; 350/162.13

[56] References Cited
U.S. PATENT DOCUMENTS
4,472,786 9/1984 Larson .................................. 382/22
4,532,548 7/1985 Zwirn .................................. 382/42
4,685,071 8/1987 Lee .................................... 364/526

Primary Examiner—Leo H. Boudreau
Assistant Examiner—Joseph Mancuso
Attorney, Agent, or Firm—Townsend and Townsend

[57] ABSTRACT

A system for shape recognition includes a spatial convolution filter which has an approximately band pass response. The filter is applied to a camera image and the sign of the filter's output is used to produce a second binary image. At sufficiently coarse (low center spatial frequency) scales, this image tends to change isolated shapes into single blob-shaped regions. The same convolution operator is then reapplied to this binary signal blob image and peaks in the output of the second convolution are used as the primitive elements for building a shape description. By processing the image with operators of two different scales the peaks shift position. The location of peaks from the coarse scale operator together with vectors to the fine scale peaks provide a description of the shape for a look-up table or other system.

5 Claims, 8 Drawing Sheets

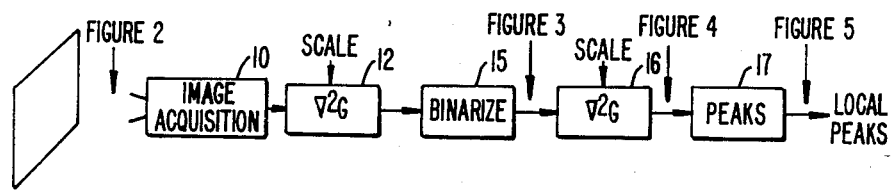
FIG._1.
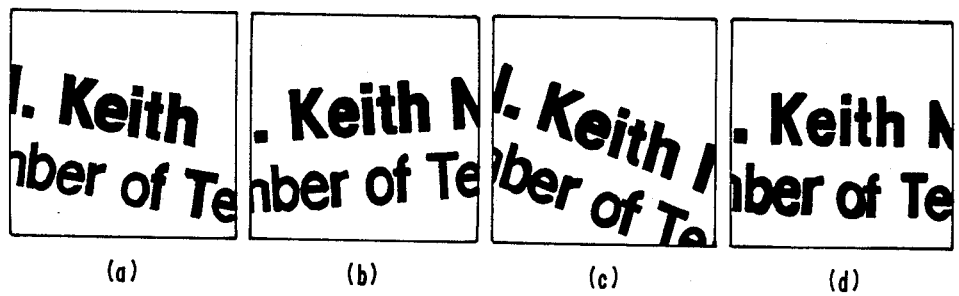
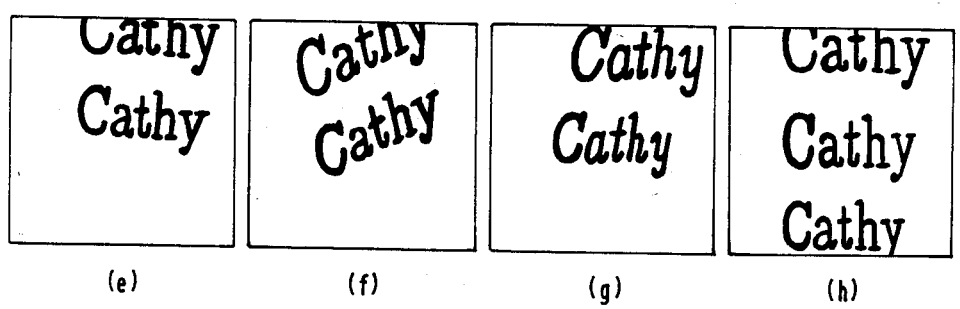
FIG._2.

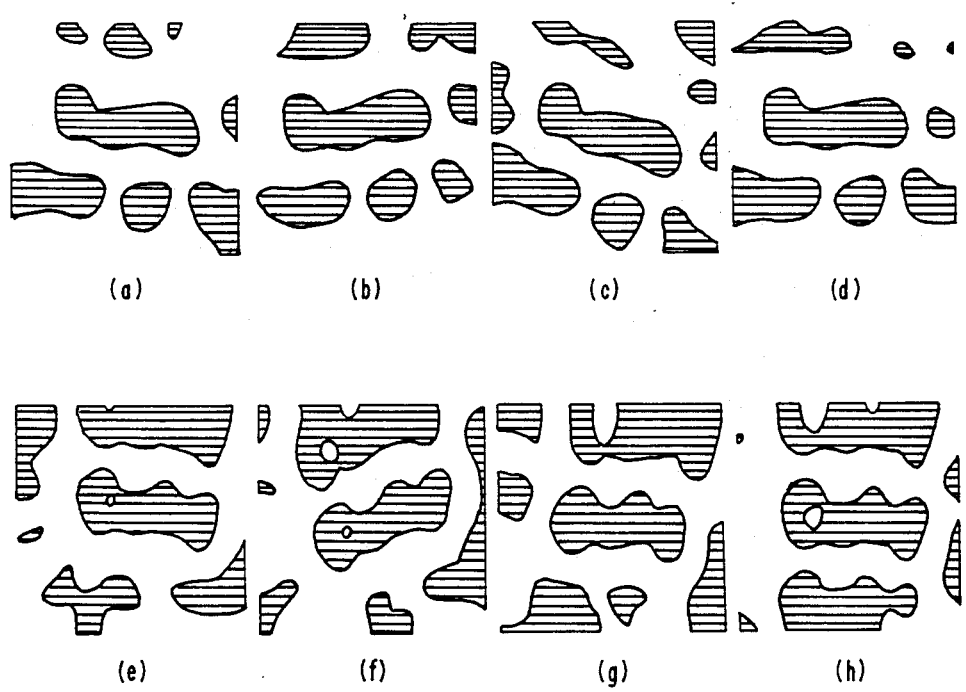
FIG._3.
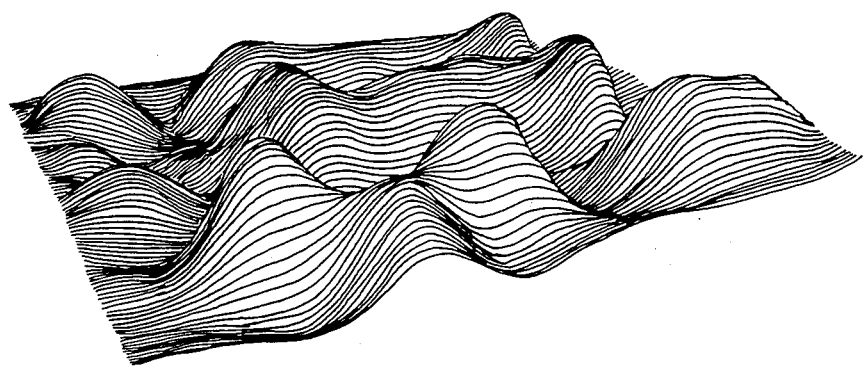
FIG._4.

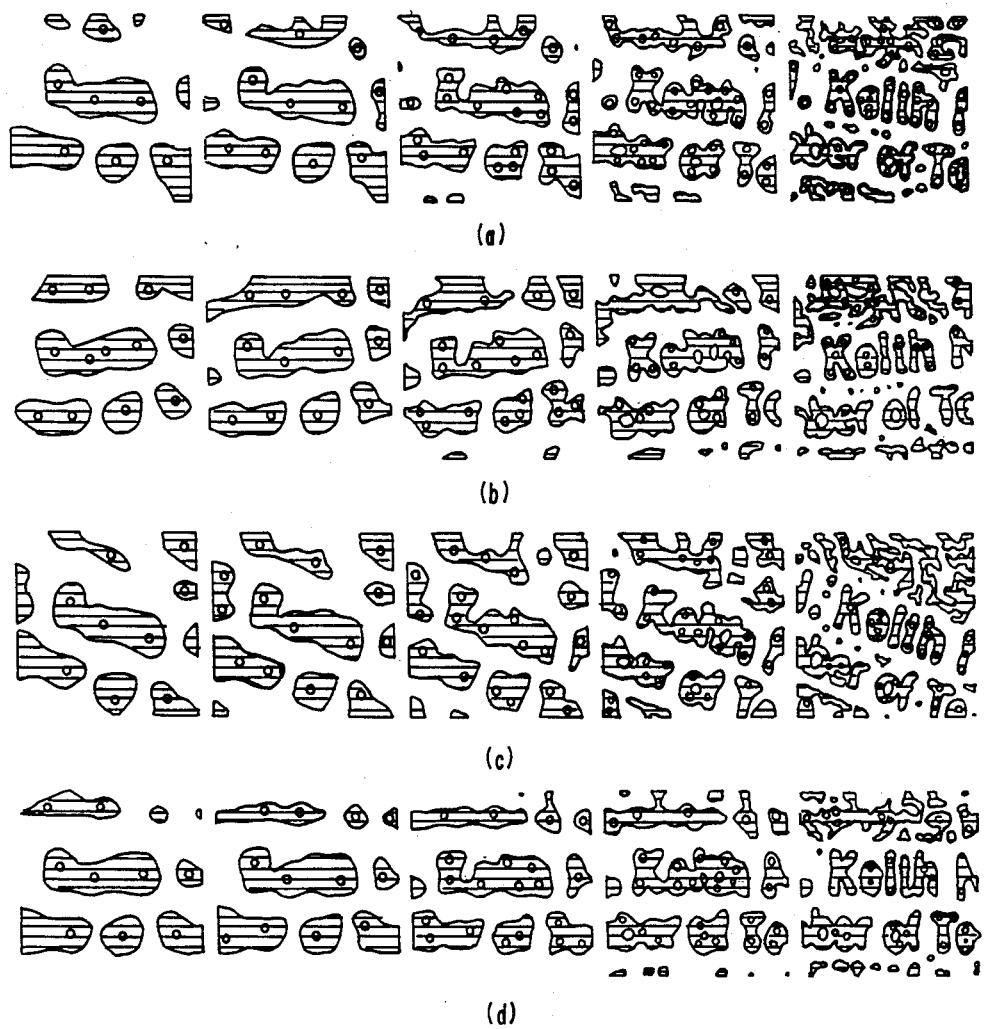
FIG._5.

FIG._6.

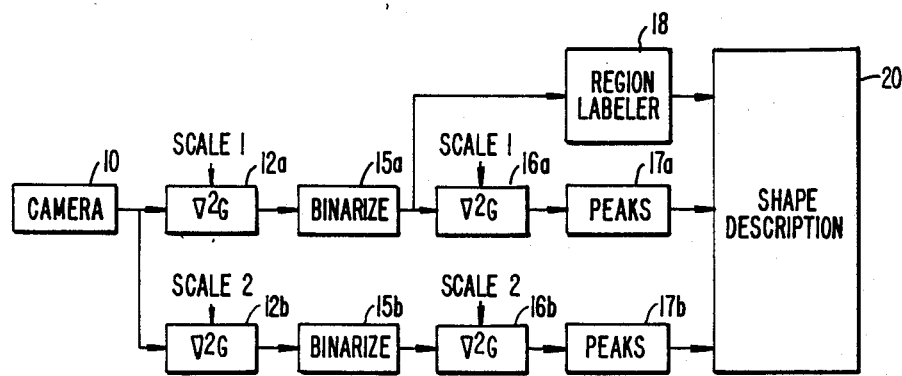
FIG._7.
FIG._8.

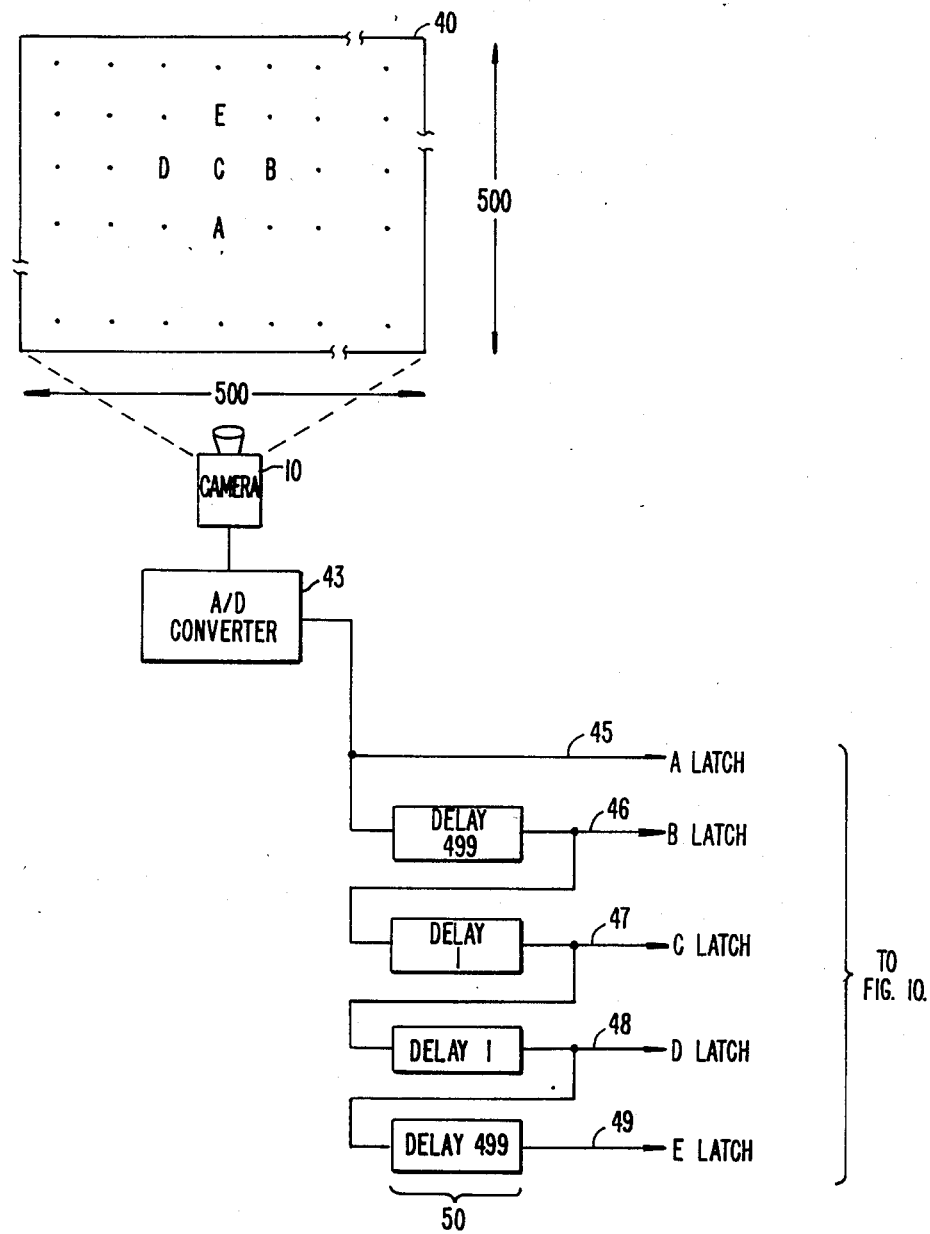
FIG._9.

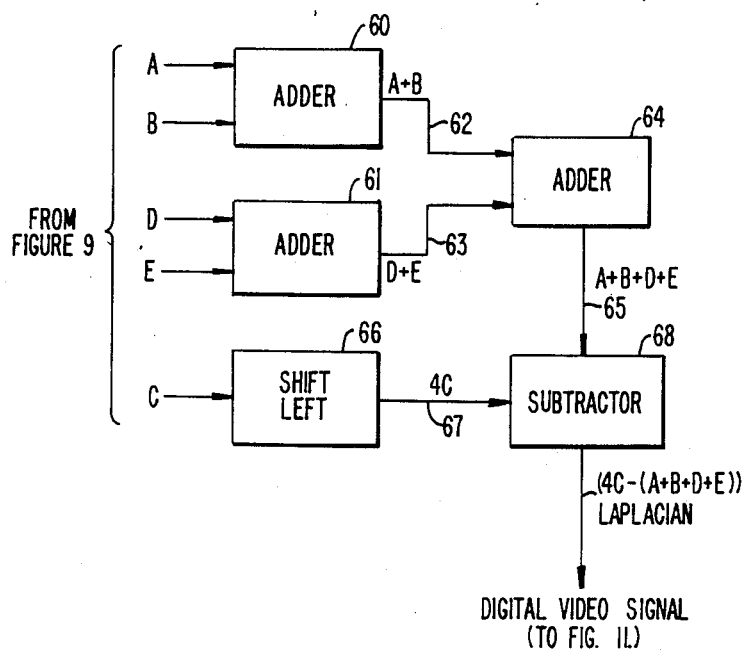
FIG._10.
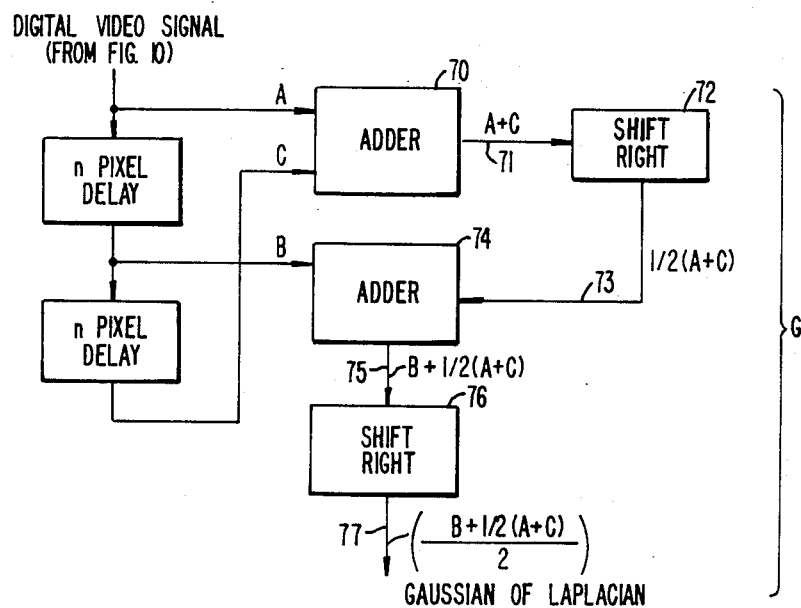
FIG._11.

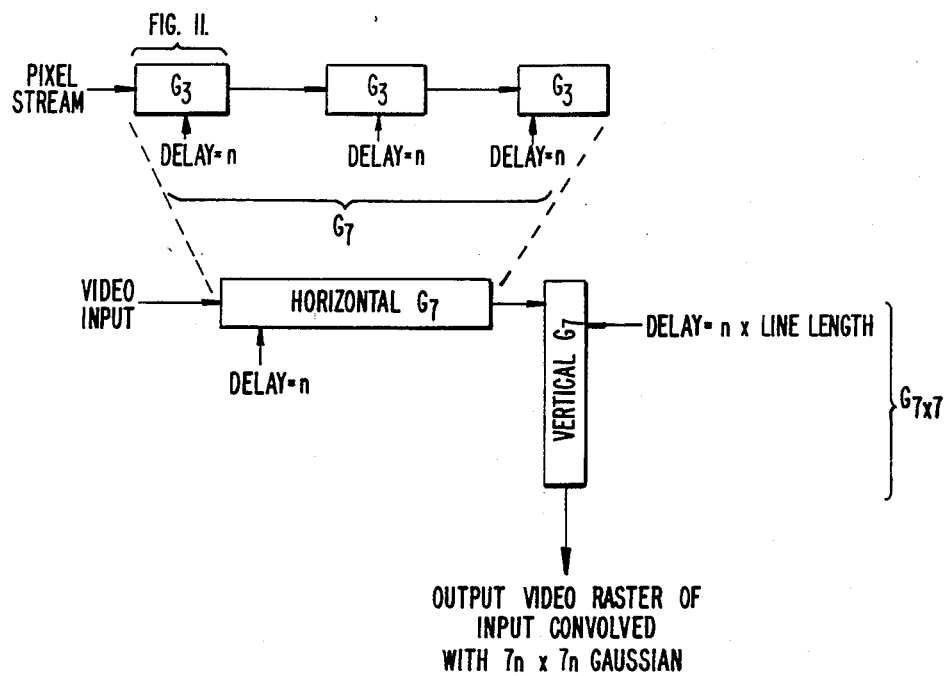
FIG._12.
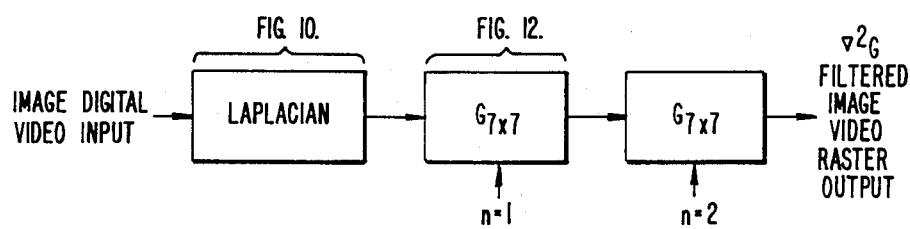
FIG._13.

SYSTEM FOR SHAPE RECOGNITION

REFERENCE TO RELATED APPLICATION

This application is a continuation-in-part of U.S. patent application Ser. No. 06/888,535, filed July 22, 1986, and entitled "System for Expedited Computation of Laplacian and Gaussian Filters and Correlation of Their Outputs for Image Processing."

BACKGROUND OF THE INVENTION

1. Field of the Invention

This invention relates to an image processing system for recognizing shapes in images acquired by cameras or other means. In particular, the system enables deriving primitive shape elements of a shape in an image which may be combined to form a description of the shape. This description then may be used to index a library of known shapes.

2. Description of the Prior Art

One of the most difficult problems in image processing is image recognition. Image recognition seeks to process images acquired using cameras or other means in a manner which extracts information content from the image, for example, for optical character recognition, quality control, remote sensing, and a host of other applications. Many different approaches have been tried for automated image recognition.

One of the oldest approaches is statistical pattern recognition, which entails forming a vector from some number of measurements deemed to be relevant to the recognition task. The hyperspace position of this multidimensional vector then is compared with the positions of like-generated vectors for a large set of known shapes, and a statistical decision made based on which shape category is most likely. This approach is simple and can be made to work well in specialized domains. The primary disadvantage is that it is incomplete. There is no real theory for what the vector measurements should be.

Template matching is another approach to image recognition. In template matching, images of each of the shapes to be recognized are stored, and each compared with the unknown image shape to determine which is most similar. This approach is again simple and easy to use in some specialized applications, but can be very expensive both in storage and search time when the domain is expanded. A further limitation arises from the static nature of the stored templates. It is difficult to allow for some kinds of flexibility in the shape definitions without significantly reducing the overall acuity of the method.

A variation of the template approach that overcomes some of these weaknesses uses templates for more primitive shape components, rather than complete shapes. For example, templates for various kinds of corners and edges are employed to construct a description of a shape. This description then can be supplied to a statistical pattern recognition system or it can be used to build a structural description.

A third approach to image recognition attempts to build a description of the geometrical structure of a shape and then use that description as an index into a catalog of known shapes. This approach has the potential for handling extremely large data bases of known shapes efficiently because lookup does not require examining everything. Additionally, arbitrarily fine distinctions can be made as the search homes. To make it work, however, requires organizing the shape catalog so that items can be found reliably from their descriptions.

SUMMARY OF THE INVENTION

This invention relates to systems for recognizing shapes in an image acquired using a camera or other means. The system provides a means for deriving primitive shape elements which are then used as a basis for building a description. Once the description is complete, it may be used as an index into a library of known shapes. The primitive elements, from which the description is built, are derivable from arbitrary images and allow explicit control over the scale of shapes structured from which they derive. Additionally, the primitive elements are tied reliability to the position of salient shape geometries. At any given scale, the geometric arrangement of elements may be used as the basis for describing shape characteristics, and these descriptions may be employed to drive searches of catalogs of known shapes in a computer recognition system.

In a preferred embodiment, a spatial convolution filter which has an approximately bandpass response is applied to the camera image and the sign of the filter's output is used to produce a binary image. At sufficiently coarse scales, this image tends to change isolated shapes into single blob-shaped regions. The same convolution operator, but without binarization, then is reapplied to this binary image, and peaks in the output of the second convolution image are determined. In another embodiment, the second convolution operator is not applied, and the peaks are sought in the non-binarized image from the first convolution. In either case, these peaks are used as the primitive elements for building a shape description. One example of a shape description, based on this type of primitive, records the peak positions obtained with a large convolution operator along with the direction of motion of each peak as the size of the convolution operator is reduced.

BRIEF DESCRIPTION OF THE DRAWINGS

FIG. 1 is a block diagram illustrating a portion of the prefer embodiment of the method of this invention.

FIG. 2 is a set of grey level images of printed names used as examples for the shape recognition system.

FIG. 3 is a set of the sign of Laplacian of Gaussian convolution representations of the images of FIG. 2.

FIG. 4 is a perspective surface plot of the Laplacian of Gaussian representation of one instance of the data of FIG. 3.

FIG. 5 is a series of images of the peaks located by the process of FIG. 1 as applied to the images of FIGS. 2a–d.

FIG. 6 is a series of images of the peaks located by the process of FIG. 1 as applied to the images of FIGS. 2e–h.

FIG. 7 is a block diagram of a preferred embodiment of the method of the invention as applied to producing shape descriptions.

FIG. 8 is a series of diagrams illustrating the output of the process shown in FIG. 7 as applied to the images of FIG. 2.

FIG. 9 is a block diagram illustrating the preferred technique for collecting pixel values for computing the Laplacian at video rates.

FIG. 10 is a block diagram illustrating the preferred technique for obtaining the Laplacian of the pixel values collected in FIG. 9.

FIG. 11 is a block diagram of the basic computing element of the preferred technique for obtaining a Gaussian convolution at video rates.

FIG. 12 illustrates the repeated application of the technique of FIG. 11 to compute a 7×7 two-dimensional Gaussian convolution of the Laplacian filtered signal.

FIG. 13 is a block diagram illustrating the combining of the Laplacian with two 7×7 Gaussian elements to efficiently produce a 21×21 Gaussian of Laplacian convolution.

DETAILED DESCRIPTION OF THE PREFERRED EMBODIMENTS

1. The Method of Operation of the System

Shape recognition can be treated as a problem of constructing a description that captures those aspects of an imaged shape that are pertinent, while ignoring or deemphasizing aspects that are less important to the shape. This does not mean that information is discarded. Rather, it is an observation that the problem of shape recognition is to a large extent a problem of organization—what information matters and what information confounds the task. For example, the relative geometric distribution of mass in a body is generally an important determiner of the shape of a body. On the other hand the size, position, and orientation of the body is usually less important. Unfortunately, information from sensing devices like cameras confounds placement, mass distribution and a host of their properties of the subject and the imaging environment. Thus, the pixel values in a frame grabber's buffer, while related to the imaged shape, are not very useful as an index into a shape catalog because changes in illumination or translation of the object completely change the state of the pixel array.

A solution to the recognition problem, then, entails first deciding what to represent in a description—what information matters and how should that information be further organized?. For example, a description of a human shape probably should place more emphasis on the number of limbs than on the articulation of a finger. Once a representation is formulated, a practical means for deriving it from available sensor data, for example, camera images, must be developed. It is easy to propose representations that solve the recognition problem but are not themselves derivable because they require inverting image projections that are not generally invertible. The primitive elements used for shape recognition to be presented below attempts to balance the needs of the recognition problem with the constraints of computability.

This invention provides a method for deriving stable shape related positions in images of two-dimensional shapes. These shape-related positions are referred to as primitives herein. These primitive positions can be used to construct shape descriptions that are simple, stable, and sensitive. They are simple in the sense that effective descriptions can be built with only a few primitives, and the descriptions are not tailored to any particular type of shape. They are stable in the sense that they do not change significantly for many effects not relevant to shape such as translation, rotation, and scaling. They are also reasonably stable against changes at different levels of scale. For example, both the italicized and non-italicized versions of a word result in very similar descriptions for their overall shapes. Sensitivity appears to be the opposite of stability, but both stability and sensitivity are achieved by a description that decouples information of different types. Thus, for example, the effect of italicization is separated from the description of a word's overall shape.

FIG. 2 is a set of eight test images employed in the following discussion to provide an example of the operation of my system for shape recognition. FIG. 2 consists of grey level images of printed names. The images in FIGS. 2a through 2d are of the same subject (a business card) with different camera settings and positions. Image 2d, for example, is badly out of focus. FIGS. 2e through 2h are of a single name printed several times on paper, but in each figure a different font size or style is employed. The images of printed names are employed to illustrate the behavior of the shape primitives employed in this invention; however, it should be appreciated that the technique of the invention is applicable to other subject matter. For example, the system can be used to recognize integrated circuits on a printed circuit board, or numerous other objects or portions of images.

FIG. 1 is a block diagram illustrating a preferred embodiment of the process of my invention. As shown there, the process begins with the camera 10 acquiring an image within which shapes are to be recognized, for example, an image such as any of the images shown in FIG. 2. In other embodiments of the invention, range images or other types of images, such as flow-field images produced by other types of sensor modules are employed. In range images the parallax input from a scanned laser beam offset from an image sensor is employed. This provides a different image for processing.

As shown by FIG. 1, the intensity image from camera 10 (or the range or other image) is supplied to a Laplacian of Gaussian convolution operator 12. The Gaussian is a two-dimensional Gaussian which functions to low pass filter the image in a way which attenuates high spatial frequencies while preserving the geometric structure at lower spatial frequencies. The size of the Gaussian controls the scale at which structure remains in the filtered image. The Laplacian operator detects locations of the low pass filtered image where local maxima in the rate of brightness change occur. These locations coincide closely with the locations where the Laplacian has zero value. The specific apparatus for performing the convolution, as well as the other operations depicted in FIG. 1, is discussed below.

Although many different types of filters may be employed to enhance the low frequency structure, in the preferred embodiment a Laplacian of Gaussian ($\nabla^2 G$) convolution operator is used. The Gaussian is a two-dimensional Gaussian which functions to low pass filter the image in a way that attenuates high spatial frequencies while preserving the geometric structure at lower spatial frequencies. The size of the Gaussian controls the scale at which structure remains in the filtered image. The Laplacian term detects locations in the low pass filtered image where local maxima in the rate of brightness change occur. These locations coincide closely with the locations where the Laplacian has zero value. It is known that:

$$(\nabla^2 G) * I = \nabla^2(G * I) = G * (\nabla^2 * I) \tag{1}$$

where $\nabla^2$ is the Laplacian, G is the Gaussian, I represents the image, and * represents the convolution.

Hence, the order in which the operators are applied does not effect the result.

Application of the Laplacian of Gaussian convolution operator and taking the sign of the result creates the images of FIG. 3 from those of FIG. 2. The binarization step is represented by block 16 in FIG. 1. It will be appreciated that once the image is scanned and digitized such an operation may be performed using a suitably programmed conventional general purpose digital computer. While this is feasible, the use of conventionl digital computers is undesirably slow, requiring on the order of 30 seconds or more to process a single image. Because commercial applications of the system compel processing much more quickly, a processor with a special architecture is employed to perform the necessary calculations. This processor is described below in conjunction with FIGS. 9–13.

There are several approaches for approximating the Laplacian of Gaussian convolution of the image. For example, a difference of two Gaussian convolutions where the Gaussians have space constants $\sigma_e$ and $\sigma_i$ such that:

$$1 < \frac{\sigma_i}{\sigma_e} < 2 \tag{2}$$

or so, and the Gaussians are normalized to have the same volume provides a very close approximation of the Laplacian of Gaussian convolution. The Laplacian of Gaussian convolution may also be considered as a bandpass filter because the Gaussian is a low-pass operation and the Laplacian a high-pass operation. Neither operation has very sharp roll-off to either side of the center frequency. Any filter with properties such as above will be appropriate for the approach we employ. Importantly, only the sign of the convolved signal is used, thereby relying upon the zero crossing locations of the convolution.

FIG. 3 illustrates the sign of Laplacian of Gaussian convolution (SLOG) representation of the images of FIG. 2 for a large convolution operator with center diameter on the order of the size of a letter in the image. The images of FIG. 3 are achieved by passing the video signal from the camera used to acquire the images through SLOG convolution filter 12 and binarizing the result. The scale input to this filter sets the diameter in pixels of the convolution kernel. Only the sign, positive or negative, of the output of the filter, is retained, and it is that image which appears in FIG. 3. The SLOG representation of FIG. 3 allows extraction of a binary image which shows the overall envelope shape of the words from the examples of FIG. 2. Because the sign pattern is thus tied to the overall position of the text on the image surface, and not with any particular location for finer features, it is insensitive to distortions such as fringe effects, interference, blurring, dirt, noise, etc., which are present in the image. Thus, this technique captures the coarse scale structure of the patterns and is relatively insensitive to high frequency noise. It is therefore ideally suited to camera images, which typically exhibit significant noise.

There are many different techniques which might be employed to describe the shapes shown in FIGS. 2 or 3. The binary image of either figure itself or the contour of its boundary, or derivatives such as inflection points in the contour, could be employed as descriptions. These approaches, however, tend to be complex and unstable. Additionally, they rely too heavily upon having a completely isolated shape. In contrast, the shape characteristic of this invention focuses on positions where the mass of the shape is concentrated. For example, the bulbous ends of the center shapes in FIGS. 3a–d or the ends and middle right position in FIGS. 3e–h. These positions are distinct in the figures, and their spatial arrangement may be used to form a shape code to distinguish Cathy from Keith.

More precisely, our objective is to identify centers of mass concentration in the SLOG representation. These are locations where the average density of, for example, the dark matter in FIG. 3 is at a local maximum. This is a scale specific property. One way to measure average mass density at a give scale centered at a point is to compute the integral of SLOG values over a circular area centered on that position. The size of the integration will identify some kinds of mass centers such as the centers of isolation objects, but not some of the more subtle concentrations such as the corners of rectangular solids. These latter forms of mass-concentration are a weaker effect prominent over a narrow range of scales and are dominated by the stronger global mass-centers. These weaker scale-specific mass-centers can be accentuated by a broad band-pass filter such as the Laplacian of Gaussian convolution. This selective filtering boosts the relative amplitude of narrow band peaks sufficiently to make them detectable.

The convolution filter has a center-surround shape which means that—for binary images—it gives a maximum response at circular sign blobs with diameters matching the diameter of the center region of the filter. It also produces local maxima near the centers of regions that at least partially resemble circular disks. FIG. 4 shows a magnitude plot of the result of applying the computation of FIG. 1 to FIG. 2(e). Note the four peaks on each instance of the name Cathy in the input image.

One technique for identifying bulges in the filter shapes of FIG. 3 is to apply a further Laplacian of Gaussian (LOG) filter to the binary sign representation. This step is represented in FIG. 1 by the second filter 16. Filter 16 may consist either of a second filter in a pipeline, or a feedback loop which reintroduces the data to filter 12. The particular system employed depends primarily upon the speed with which the images are to be processed. The convolution filter has a center surround shape which, for binary images, gives the maximum response at circular shapes with diameters matching the diameter of the center region of the filter. The operator also produces local maxima near the centers of regions that at least partially resemble circular disks.

FIG. 4 is a magnitude plot of the result of applying the Laplacian of Gaussian convolution operator to FIG. 3d. In FIG. 4 there are three strong peaks, as well as a fourth weaker one, for each instance of the name Cathy in the initial image.

Once the LOG convolution operation 16 has been applied to the sign result of the first application of the LOG convolution operator, the peaks of the resulting surface are detected. Each of FIGS. 5a–d illustrates an overlay of the SLOG representation at five progressively finer scales, as well as the corresponding LOG-SLOG peaks for each of the images of FIG. 2. The peaks located by the process are shown as small circles overlaid on the SLOG representation. In FIG. 5, the peak positions identified for each shape tend to occur at locations where the shape has a distinct end, bend, or junction. This is particularly apparent in the fine scale figures along the right-hand edge of FIGS. 5a-d. FIG. 6 depicts the effect of the same process on the images of FIGS. 2e-h.

Once the peaks have been located, the peaks are used as a method for constructing a shape description of the image. A preferred method for achieving this is shown in block form in FIG. 7. As shown there, the image from the camera is processed in the same manner as described in FIGS. 1-6, but at two different scales, a first scale applied to filters 12a and 16a and a second scale applied to filters 12b and 16b. Although FIG. 7 shows two different sets of apparatus for processing the images at different scales, a multiplexing operation could be employed to enable both scales to be processed using the same apparatus. Again, the choice of which method is employed will depend primarily upon the speed with which the completed image is desired. In the preferred embodiment, one of the scales is a fairly coarse scale where the entire word condenses into a single blob, while the other scale is about 20% smaller than the first. Additionally, a region labeler 19 usually is employed in the coarse scale representation to label the object closest to the center of the image. This labeled region is used to restrict the attention of the finer scale process to just those peaks lying within that area.

FIG. 8 illustrates the application of this method to the images of FIG. 2. The predominantly dark upper portion of each of FIGS. 8a-h is an overlay of the coarse scale sign blob closest to the center of the image with peaks from that scale, as well as from the finer scale. The larger circles indicate the coarse scale peaks, while the finer circles represent the finer scale peaks. The movement of the peaks with changes in scale, and the bifurcation of peaks, is due to the relationship between structures in the shape at different scales. The lower part of each of FIGS. 8a-h which shows the coarse peaks along with short vectors indicating the directions to nearby peaks at the finer scale. Notice that these angular descriptions are similar within each of the sets of FIGS. 8a-d and 8e-h except for occasional additions or deletions. Importantly, the locations of the peaks can be described with respect to each other, not with respect to any reference location. The lower portion of each of the FIGS. 8a-h provides a basis for a shape indexing system. In addition, the location of the "center of mass" of the peaks provides a means for resolving ambiguities in interpretation of the image, e.g., rightside up—upside down.

In an alternative embodiment of the invention, suitable for some applications the binarizing step 15 and second filtering operation 16 (see FIG. 1) are omitted. In this circumstance the peaks are detected in the first filtered image, and these peaks are used as the primitive elements. In the same manner as described in conjunction with FIG. 7, movement of the peaks with changes in convolution operator scale provides a basis for shape indexing.

The filtering system and resulting peaks described herein, as well as the method for constructing shape descriptions from them, is applicable to a broad range of recognition problems. For example, the shape representation method may be employed in font-independent word and character recognition. Current optical character reader systems require special facilities for each font or character style. As shown herein, the word shape can be used to identify commonly-used words in textual material, with similar methods employed to identify individual letters. As discussed below, the method can be implemented to operate at high speeds using relatively inexpensive hardware. Additionally, the technique permits the recognition of printed Chinese characters, which like printed Roman words, have well structured shapes going from relatively simple at coarse scales to increasingly more complex at finer scales.

An additional use of the method presented here is to describe the shapes of parts on circuit boards. For example, for quality control inspections the differences between good and bad situations, such as part registration on a board, may be found from a comparison of relatively simple peak descriptions. The method described herein allows tests for widely varying kinds of problems to be taught to a system at a high level.

2. Apparatus for Carrying Out the Method

FIG. 9 illustrates a first portion of the apparatus for carrying out the method of my invention In the preferred embodiment, the image of the pattern or object acquired by camera 10 is acquired using conventional optical technology, for example with a vidicon camera, a CCD camera, a scanning electron microscope, or the like. Once the image is acquired, it is digitized if necessary, using an analog-to-digital converter 43, and a filtering operation is performed to enhance the low frequency structure in the pattern while attenuating the high frequency information. The result is a filtered image such as depicted in FIG. 3. For explanation, assume that in the preferred embodiment, the pattern to be filtered consists of approximately 500×500 pixels.

Once the digitized pixel pattern has been acquired, the first step of the method is to apply the Laplacian function. Although either the Laplacian or Gaussian functions could be applied first without affecting the result, application of the Laplacian function first provides certain advantages. In particular, by applying the Laplacian function first, the video signal is centered on zero and then smoothed. This allows better use of n bit integer resolution because the n bit numbers are not required to characterize as wide a range of signal as would exist were the Gaussian function applied first. Applying the Laplacian first reduces the amount of scaling required through the Gaussian pipeline to keep the convolution values in range.

Convolving with a seven-point normalized Gaussian operator reduces the amplitude of a typical Laplacian filtered image by about a factor of two. In the preferred embodiment, therefore, the shift is one less bit right for each seven-point Gaussian operator. In other words, the amplitude of the output signal is boosted by a factor of two after application of each seven-point Gaussian operator. In terms of the hardware required, this allows gaining one bit of precision with each subsequent seven-point Gaussian operator. Thus, in a preferred system having four such operators, four bits are gained, or equivalently four bits are saved in the pipeline data width while obtaining the same precision in the final output.

The 500-pixel square image 40 is shown at the top of FIG. 9. If the Laplacian function is to be applied to pixel C, then the binary value, typically to 8-bit accuracy, for each of pixels A-E must be retrieved and appropriately weighted. The apparatus of FIG. 9 illustrates one technique for retrieving the desired pixels. As the desired pattern is acquired as a noninterlaced video raster scan from camera 10 and A-D converter 43, at some given instant pixel A will be supplied on line 45. At that time, line 46 will hold B, the value received 499 pixels earlier.

Similarly, lines 47, 48, and 49 will hold pixels C, D, and E, respectively, which were received 500, 501, and 1000 pixels earlier than A. Thus, this configuration produces five simultaneous samples making a cross pattern from the image as shown at the top of FIG. 9. Note that when the next pixel arrives at 45, the entire cross pattern of samples will move one pixel to the right on the image following the raster scan. As the value for each pixel is retrieved, it may be latched before being supplied to subsequent processing. The delay elements 50 shown in FIG. 9 are known delay elements, for example, a shift register or a random access memory.

FIG. 10 illustrates apparatus for obtaining the Laplacian of the acquired pixel values. A satisfactory approximation to the Laplacian function at a given pixel location is to apply a weight of 4 to that particular pixel and a weight of −1 to the pixels above, below, to the left, and to the right of the specified pixel. As shown in FIG. 10, the pixel values for pixels A and B are supplied to adder 60, while those for pixels D and E are supplied to adder 61. As a result, adder 60 supplies an output signal A+B on line 62, while adder 61 supplies an output signal D+E on line 63. Another adder 64 connected to receive the signals on line 62 and 63 then supplies an output signal on line 65 indicative of the sum of all of pixels A, B, D, and E.

The pixel value for pixel C is supplied to a shifter 66. By shifting the pixel value two places left, the value is effectively multiplied by four, and the results supplied on line 67 to subtractor 68. Subtractor 68 combines the sum supplied on line 65 with the quadruply-weighted value on line 67 to achieve a new value which approximates the Laplacian at pixel C of the input image. Thus, the output 68 carries a video rater signal of the Laplacian of the input image. This signal is fed to the next stage of processing, the Gaussian convolver.

The manner by which the Gaussian convolution is applied is shown in FIGS. 12 and 13. In the preferred embodiment, the fact that a two-dimensional Gaussian convolution can be decomposed into a composition of one-dimensional Gaussian convolutions is employed. This is because the two-dimensional Gaussian can be written as the product of two one-dimensional Gaussians:

$$G(x,y) = \exp\left[-\frac{x^2 + y^2}{\sigma^2}\right] \quad (3)$$

$$= \exp\left[-\frac{x^2}{\sigma^2}\right]\exp\left[-\frac{y^2}{\sigma^2}\right] \quad (4)$$

$$= G(x)G(y) \quad (5)$$

This allows decomposing the two-dimensional convolution integral as follows:

$$G(x,y)*I(x,y) = \int_{-\infty}^{\infty}\int_{-\infty}^{\infty} G(u,v)I[(x-u),(y,v)]dudv \quad (6)$$

$$= \int_{-\infty}^{\infty} G(v) \int_{-\infty}^{\infty} G(u)I[(x-u),(y-v)]dudv \quad (7)$$

$$= G(y)*[G(x)*I(x,y)] \quad (8)$$

where I(x,y) is the input image to be convolved.

Thus, a two-dimensional Gaussian convolution is achieved by means of two cascaded one-dimensional convolutions which are much less expensive computationally to accomplish. The one-dimensional Gaussian operator may be approximated by a binomial distribution in one dimension. For example, the seven-point binomial distribution 1, 6, 15, 20, 15, 6, 1 is quite close to the Gaussian. In the preferred embodiment, a three-point binomial operator is employed with weights of 1, 2, 1 three times to produce the effect of a convolution with the seven point binomial distribution. This choice allows a particularly efficient hardware implementation, and is illustrated in FIG. 11.

FIG. 11 illustrates the operation of the three-point mechanism, $G_3$. A digital raster input is applied to the input of two serially-connected delay elements. These delay elements will both introduce a delay of n pixels between their input and output terminals, where n equals one or two pixels for horizontal convolutions and n equals the image line length or twice the image line length for vertical convolutions. From these delay elements three simultaneous values A, B, and C, separated by n pixels from each other in the image, are obtained. A and C are applied to adder 70 and the sum supplied on line 71 to a shifter 72. Shifter 72 shifts the sum of A+C one place to the right, in effect dividing it by two. The output signal on line 73 is supplied to adder 74 in conjunction with the binary value for pixel B. Adder 74 thereby provides on line 75 a value equal to the sum of the value of pixel B plus one-half the sum of values of pixels A and C To maintain correct amplitude, this result is shifted right one place by shifter 76, and the result supplied on line 77. The result on line 77 is the input signal smoothed by a three-point binomial distribution. To obtain a finer approximation to the Gaussian, the procedure of FIG. 11 may be repeated more than once as shown in FIG. 12.

FIG. 12 illustrates how a pipeline of three three-point Gaussian convolution elements $G_3$ of FIG. 11 is configured. This device convolves the input video stream with a 7-point binomial approximation to a one-dimensional Gaussian $G_7$. If the delay elements are set to produce a delay of one pixel, this will be a horizontal Gaussian convolution. If the delay elements are set to the line length of the image, this will be a vertical convolution. One of the $G_3$ operators of each $G_7$ operator does not include the normalization operation for the reasons discussed above.

To accomplish a 7×7 two-dimensional Gaussian convolution, two $G_7$ elements, one with delay set for a horizontal convolution and the other with delay set for a vertical convolution are used. The lower portion of FIG. 8 illustrates my technique using a pipeline of two $G_7$ elements to produce a $G_{7\times7}$ element. In practice, a larger Gaussian filter than the 7×7 operator described is required. Similar techniques as described above could be used to build arbitrarily large filters; however, I have found a more efficient approach. After the application of the $G_{7\times7}$ filter, the input signal has been low pass filtered sufficiently that a subsequent operator that samples only every other pixel will not suffer from aliasing problems. Thus, a 14×14 Gaussian convolution can be approximated by the $G_{7\times7}$ operator with its points spread out by increasing its horizontal delays from one to two pixels and its vertical delays from one line length to two line lengths.

FIG. 13 shows two $G_{7\times7}$ elements to produce effectively a 21×21 Gaussian convolution operator in a video pipeline with the Laplacian operator at the start. The result is a $\nabla^2G$ filtered image. Only the sign of the filtered image is saved and supplied to filter 16 (see FIG.

1). If instead of the pipeline system described, a feedback system is to be employed, then the signs of the values from filter 12 are temporarily stored until the filter is available for further processing using the signs as input values for a second pass through the filter. In either event, the binary image is again filtered using the same technique as described in conjunction with FIGS. 9–13. This time, however, the actual pixel values are saved, not just the signs of the pixel values. These actual pixel values which are employed in determining the peaks in the resulting representation, as shown by FIG. 4.

One technique for determining the peak location employs software. After at least the first three rows of the raster scan image have been supplied, the upper left-hand corner group of 3×3 pixels are loaded into registers and a test is performed to determine whether the middle pixel (second row, second pixel) is greater than each of the other pixels by a prescribed threshold amount, for example, 10%. If so, then the address of this middle pixel is saved. Next, the test is continued by shifting the 3×3 pixel matrix one pixel to the right from the upper left-hand corner pixel so that pixels 2 through 4 in each of rows 1-3 are tested. After the entire image is scanned, then the memory will contain all of the peak locations for the particular scale at which the image was scanned. The process described above for determining the locations of the peaks represents each of blocks 17a and 17b in FIG. 7.

Depending upon the desired speed of execution and the cost of the apparatus, special purpose hardware may be employed in lieu of the software process described above. Such special purpose hardware is of the form shown in FIG. 9, except rather than latching in on only five pixel values A-E, nine pixel values are latched and then tested to determine if the middle pixel is greater than the surrounding pixels by the prescribed threshold.

After all the peaks are found, their addresses are stored in a suitable memory. Then, the coarse scale peaks are used as origins for a search for the smaller scale peaks nearby. Although the search for fine scale peaks may be performed within any arbitrary distance of the coarse scale peaks, in the preferred embodiment the operator diameter of the finer Laplacian of Gaussian convolution is employed. This search is done in software, and once completed the coarse peaks are annotated with the addresses or other identification of the nearby small peaks. Then, the angle to the small peaks is computed using a conventional conversion from rectangular-to-polar coordinates. The result is shown in the lower portion of each of FIGS. 8a–h. In the preferred embodiment, only the angular relationship between the coarse peaks and the small peaks is determined; however, the displacement between the peaks is a result of the coordinate transformation and could be included for those applications where the displacement is of importance.

At this stage in the process, there is therefore a list of vectors to the small scale peaks for each of the coarse scale peaks in a given "blob." Next, a best fit line through the coarse peaks is determined, for example, using least squares approximation, the shape is described using that information. In the preferred embodiment this is achieved by software in the shape description block 20 of FIG. 7. The description includes the position of each peak with respect to the center point, or other reference point, along the line, an indication of how far above or below the line that coarse peak is, and a list of the vectors to the small scale peaks from the coarse scale peak. This information then is employed in a look-up table in which target shapes are stored. The shapes in the table can be indexed in a variety of ways, for example, by groups as determined by the coarse measurement, with an individual sort within the group based upon the vectors. The particular indexing system employed depends primarily on the application to which the system is applied.

Although preferred embodiments of the method of my invention have been described above, these embodiments are for the purposes of illustration and not limitation. The scope of the invention may be determined from the appended claims.

I claim:

1. A machine method of processing an image containing pixels comprising:
    applying a first Laplacian of Gaussian convolution to the image to produce a first filtered image;
    extracting the sign of each pixel in the first filtered image to provide a second filtered image;
    applying a second Laplacian of Gaussian convolution to the second filtered image to provide a third filtered image; and
    detecting a first set of peaks in the third filtered image, where said peaks are used to establish a shape description of original image.

2. A method as in claim 1 further comprising:
    applying a third Laplacian of Gaussian convolution having a smaller operator to the image to produce a fourth filtered image;
    extracting the sign of each pixel in the fourth filtered image to provided a fifth filtered image;
    applying a fourth Laplacian of Gaussian convolution having the same smaller operator to the fifth filtered image to provide a sixth filtered image;
    detecting a second set of peaks in the sixth filtered image.

3. A method as in claim 2 further comprising:
    establishing a description of the image from both the first set of peaks and the second set of peaks.

4. A method as in claim 3 wherein the step of establishing comprises:
    detecting which ones of the second set of peaks are disposed within a specified distance of ones of the first set of peaks; and
    determining the angular relationship between each one of the first set of peaks and those of the second set of peaks disposed within the specified distance of that one of the first set.

5. A method as in claim 4 further comprising:
    characterizing the image by determining a best fit line through the first set of peaks, the coordinates of each peak of the first set with respect to a point on the best fit line, and the angular relationship.

* * * * *